(12) United States Patent
Rumanek et al.

(10) Patent No.: US 11,397,681 B2
(45) Date of Patent: Jul. 26, 2022

(54) MULTI-CACHE BASED DIGITAL OUTPUT GENERATION

(71) Applicant: Aux Mode Inc., Toronto (CA)

(72) Inventors: Adam Rumanek, Toronto (CA); Charles Sinsofsky, Toronto (CA)

(73) Assignee: AUX MODE INC., Toronto (CA)

( * ) Notice: Subject to any disclaimer, the term of this patent is extended or adjusted under 35 U.S.C. 154(b) by 107 days.

(21) Appl. No.: 17/129,007

(22) Filed: Dec. 21, 2020

(65) Prior Publication Data

US 2022/0197796 A1     Jun. 23, 2022

(51) Int. Cl.
| | | |
|---|---|---|
| *G06F 12/00* | (2006.01) | |
| *G06F 12/0811* | (2016.01) | |
| *G06F 12/0813* | (2016.01) | |
| *G06N 20/00* | (2019.01) | |
| *G06F 12/0855* | (2016.01) | |
| *G06F 9/451* | (2018.01) | |
| *G06F 12/0831* | (2016.01) | |

(52) U.S. Cl.
CPC .......... *G06F 12/0811* (2013.01); *G06F 9/451* (2018.02); *G06F 12/0813* (2013.01); *G06F 12/0833* (2013.01); *G06F 12/0859* (2013.01); *G06N 20/00* (2019.01)

(58) Field of Classification Search
CPC .. G06F 12/0811; G06F 9/451; G06F 12/0813; G06F 12/0833; G06F 12/0859; G06N 20/00
See application file for complete search history.

(56) References Cited

U.S. PATENT DOCUMENTS

| | | | | |
|---|---|---|---|---|
| 2006/0238919 | A1* | 10/2006 | Bradley | G06F 16/215 |
| | | | | 360/128 |
| 2012/0110267 | A1 | 5/2012 | Karkkainen et al. | |
| 2015/0046389 | A1* | 2/2015 | Dhayapule | G06F 16/245 |
| | | | | 707/602 |
| 2018/0301158 | A1* | 10/2018 | Zou | G10L 19/032 |
| 2019/0147371 | A1* | 5/2019 | Deo | G06N 20/20 |
| | | | | 706/12 |
| 2019/0325528 | A1* | 10/2019 | Adjaoute | G06N 20/00 |
| 2019/0378043 | A1* | 12/2019 | Pippenger | G06N 20/20 |

(Continued)

OTHER PUBLICATIONS

Int'l Search Report and Written Opinion received in PCT/IB2021/060769 dated Jan. 6, 2022, 11 pages.

*Primary Examiner* — Shawn X Gu
*Assistant Examiner* — Mohammad S Hasan
(74) *Attorney, Agent, or Firm* — Foley & Lardner LLP

(57) ABSTRACT

Multi-cache-based digital output generation is provided. A system receives data objects that include fields from a remote data source. The system sorts the data objects based on a field to generate a sorted data set. The system cleans the sorted data set to generate a clean data set based on a policy. The system receives a request for a type of digital output based on the data objects received from the data source and loads a portion of the clean data set to a first level cache. The system selects a machine learning model configured for the type of digital output, and loads a primary cache with a subset of fields stored in the first level cache selected based on the machine learning model. The system generates, based on the first level cache being complete, digital output corresponding to the type of digital output from data in the primary cache.

20 Claims, 7 Drawing Sheets

(56) References Cited

U.S. PATENT DOCUMENTS

| | | | |
|---|---|---|---|
| 2020/0019893 A1* | 1/2020 | Lu | G06N 20/00 |
| 2020/0201759 A1* | 6/2020 | Korzh | G06F 12/0862 |
| 2020/0341899 A1 | 10/2020 | Dias et al. | |
| 2021/0055995 A1* | 2/2021 | Biernacki | G06K 9/6272 |
| 2021/0089947 A1* | 3/2021 | Beavers, Jr. | G06N 5/04 |
| 2021/0103936 A1* | 4/2021 | Gomes Pereira | G16H 40/20 |
| 2021/0192389 A1* | 6/2021 | Guan | G06F 16/215 |
| 2022/0138509 A1* | 5/2022 | Crosby | G06K 9/6261 |
| | | | 706/12 |
| 2022/0164386 A1* | 5/2022 | Ostadzadeh | G06F 16/909 |

* cited by examiner

| Customer ID | Asset ID | Video Title | Usage Views | Usage Partner-Provided Revenue | UGC Views | UGC Match Revenue | Digital Streaming Premium Revenue | Total Views | Total Revenue |
|---|---|---|---|---|---|---|---|---|---|
| ABC_1111 | A111 | Video_Title_1 | 326806 | $969.62 | 0 | $0.00 | $13.23 | 326806 | $982.85 |
| ABC_1112 | A112 | Video_Title_2 | 214628 | $444.12 | 2417 | $2.28 | $6.44 | 217045 | $452.83 |
| ABC_1113 | A113 | Video_Title_3 | 67115 | $182.51 | 0 | $0.00 | $2.04 | 67115 | $184.55 |
| ABC_1114 | A114 | Video_Title_4 | 33600 | $168.19 | 0 | $0.00 | $2.55 | 33600 | $170.74 |
| ABC_1115 | A115 | Video_Title_5 | 29967 | $134.64 | 0 | $0.00 | $2.45 | 29967 | $137.09 |
| ABC_1116 | A116 | Video_Title_6 | 31905 | $130.74 | 0 | $0.00 | $1.85 | 31905 | $132.60 |
| ABC_1117 | A117 | Video_Title_7 | 24926 | $102.47 | 0 | $0.00 | $1.51 | 24926 | $103.97 |
| ABC_1118 | A118 | Video_Title_8 | 36671 | $61.10 | 0 | $0.00 | $0.42 | 36671 | $61.52 |
| ABC_1119 | A119 | Video_Title_9 | 18141 | $60.10 | 0 | $0.00 | $1.17 | 18141 | $61.28 |
| ABC_1120 | A120 | Video_Title_10 | 8379 | $46.35 | 0 | $0.00 | $1.38 | 8379 | $47.73 |

| Show Tag | Show Name | Total | No Season | Season 1 | Season 2 | Season 3 | Season 4 | Season 5 | Season 6 |
|---|---|---|---|---|---|---|---|---|---|
| ABCD | Show_Name_1 | 1.051524 | 0.939447 | 0.112077 | 0 | 0 | 0 | 0 | 0 |
| ABCE | Show_Name_2 | 11.107462 | 0.185382 | 8.092082 | 0.617618 | 0.60908 | 1.552952 | 0.036282 | 0.014071 |
| ABCF | Show_Name_3 | 3.063557 | 0.00826 | | | | | | |
| ABCG | Show_Name_4 | 0.086904 | 0.086904 | 0 | 0 | 0 | 0 | 0 | 0 |
| ABCH | Show_Name_5 | 137.294866 | 28.710885 | 45.145191 | 7.481599 | 6.85742 | 8.691789 | 2.114237 | 9.216903 |

MULTI-CACHE BASED DIGITAL OUTPUT GENERATION

BACKGROUND

Multimedia streaming services can stream multimedia content provided by digital content providers. However, as the number of digital content providers or multimedia content items increase, it can be challenging to accurately and reliably process performance data associated with the streamed content items in an accurate and reliable manner without excessive memory or processor utilization.

SUMMARY

One technical solution is generally directed to multi-cache based digital output generation. Systems and methods of this technical solution can receive large data files in excess of 2 gigabytes ("GB") that when loaded can be in excess of 40 GB. The data files can include tens of millions of records that this technical solution can mine via multiple threads in parallel and in real-time as additional data is received. To do so, this technical solution can build an intelligent multi-level cache using a machine learning model. For example, the system can receive data records, pre-process the data records, and then load them into a first level cache. The system can use a model trained using a machine learning technique to extract certain fields or portions of the pre-processed data, and place those portions into a primary cache. As the first level cache continues to receive data objects from the multimedia streaming service or the database, the system can continue to load data from the first level cache to the primary cache until the first level cache is complete. Once the first level cache is complete, or stops receiving additional data, the system can generate a report or other digital output based on the data in the primary cache. Thus, by using the multi-level cache and extracting data based on a model training using a machine learning technique, systems and methods of this technical solution can reduce processor utilization, memory utilization, disk read/write or input/output actions, or other computing, storage or network resource constraints.

At least one aspect is directed to a system for multi-cache-based digital output generation. The system can include a data processing system having memory and one or more processors. The data processing system can receive data objects that include fields. The data processing system can receive the data objects via a network and from a data source remote from the data processing system. The data processing system can sort the data objects based on a field to generate a sorted data set. The data processing system can clean the sorted data set to generate a clean data set based on at least one of a missing data cleansing policy, a noisy data cleansing policy, or an inconsistent data cleansing policy. The data processing system can receive a request for a type of digital output based the data objects received from the data source. The data processing system can receive the request from a client device via the network. The data processing system can load, responsive to the request, at least a portion of the clean data set to a first level cache of the data processing system. The data processing system can select, responsive to the request, a machine learning model configured for the type of digital output. The data processing system can load, responsive to the request, a primary cache with a subset of fields stored in the first level cache selected based on the machine learning model configured for the type of digital output. The data processing system can receive an indication that the first level cache is complete. The data processing system can generate, based on the indication that the first level cache is complete, a digital output corresponding to the type of digital output from data in the primary cache. The data processing system can provide, responsive to the request from the client device, the digital output to the client device for display via a display device of the client device.

At least one aspect is directed to a method for multi-cache-based digital output generation. The method can be performed by a data processing system having one or more processors and memory. The method can include the data processing system receiving via a network and from a data source remote from the data processing system, data objects. Each of the data objects can include fields. The method can include the data processing system sorting the data objects based on a field to generate a sorted data set. The method can include the data processing system cleaning the sorted data set to generate a clean data set based on at least one of a missing data cleansing policy, a noisy data cleansing policy, or an inconsistent data cleansing policy. The method can include the data processing system receiving, from a client device via the network, a request for a type of digital output based the data objects received from the data source. The method can include the data processing system loading, responsive to the request, at least a portion of the clean data set to a first level cache of the data processing system. The method can include the data processing system selecting, responsive to the request, a machine learning model configured for the type of digital output. The method can include the data processing system loading, responsive to the request, a primary cache with a subset of fields stored in the first level cache selected based on the machine learning model configured for the type of digital output. The method can include the data processing system receiving an indication that the first level cache is complete. The method can include the data processing system generating, based on the indication that the first level cache is complete, a digital output corresponding to the type of digital output from data in the primary cache. The method can include the data processing system providing, responsive to the request from the client device, the digital output to the client device for display via a display device of the client device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 5-6 depict example reports generated by the data processing system, in accordance with implementations.

DETAILED DESCRIPTION

Figure 1:
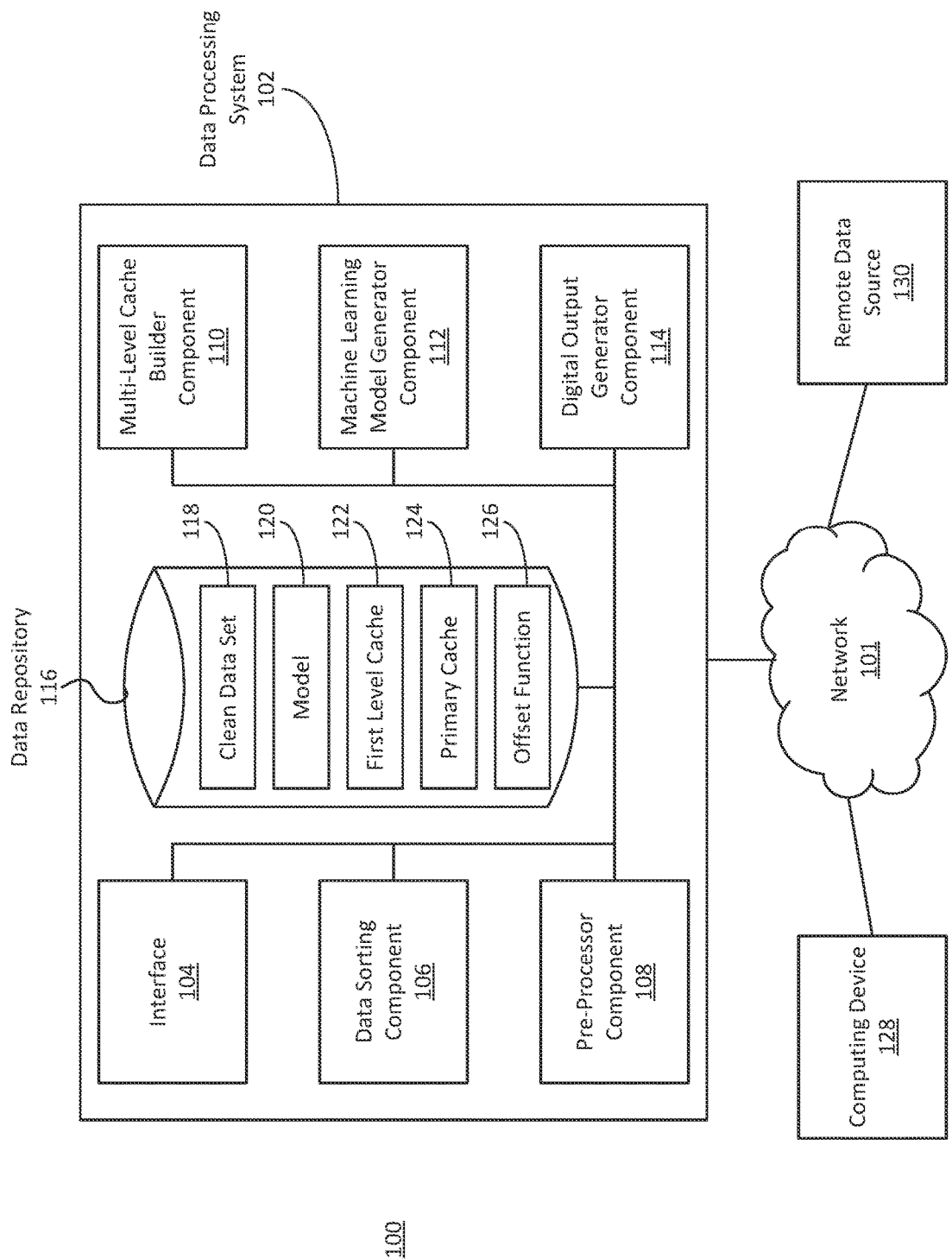
FIG. 1 is an illustration of an example system for multi-cache based digital output generation, in accordance with an implementation.

Following below are more detailed descriptions of various concepts related to, and implementations of, methods, apparatuses, and systems of multi-cache based digital output generation. The various concepts introduced above and discussed in greater detail below may be implemented in any of numerous ways.

This technical solution is generally directed to multi-cache based digital output generation. Systems and methods of this technical solution can receive large data files in excess of 2 gigabytes ("GB") that when loaded can be in excess of 40 GB. The data files can include tens of millions of records that this technical solution can mine via multiple threads in parallel and in real-time as additional data is received. To do so, this technical solution can build an intelligent multi-level cache using a machine learning model. For example, the system can receive data objects, files or records from a cloud-based multimedia streaming service. The system can pre-process the data by sorting and cleaning the data using one or more data cleansing techniques. The system can store the clean data in a database.

Responsive to a request for digital output, such as a performance report or other type of analytics, the system can load at least a portion of the clean data into a first level cache. The system can use a model trained using a machine learning technique to extract certain fields or portions of the data from the first level cache, and then load the extracted portions into a primary cache. As the first level cache continues to receive data objects from the multimedia streaming service or the database, the system can continue to load data from the first level cache to the primary cache until the first level cache is complete. Once the first level cache is complete, or stops receiving additional data, the system can generate a report or other digital output based on the data in the primary cache.

In an illustrative example, the system can receive data records, data objects, data structures or data files. The system can receive the data records from a remote data source, such as a cloud-based video streaming service. The cloud-based video streaming service can stream video to end users. The videos can be generated or uploaded to the cloud-based video streaming service by other end users or content providers, such as producers, studios, broadcasters or third-party rights holders. Each video (or content item or multimedia content item or digital asset) can have a corresponding data record. The data records can be in any format, such as a comma-separated values (e.g., .CSV), an open extensible markup language ("XML") spreadsheet (e.g., XLSX), or a portable document format file (e.g., .PDF). The data records can include fields and corresponding data entries or values with information about the video or digital asset. The fields can include, for example, an asset label, customer identifier, asset title, policy information, location, timestamp, revenue, interaction, performance information, or other information or values.

Some of the data records can be inaccurate, having missing information, be duplicative, or unorganized. Accordingly, the system can perform pre-processing on the received data records in order to organize or sort the data and clean the data. The system can sort the data based on a field in the data records and using any sorting technique. For example, the system can use a bubble sorting technique or a sorting technique based at least in part on a bubble sorting technique to sort the data records based on the customer identifier, asset label, or asset title.

Upon sorting the data records, the system can pre-process the sorted data records in order to identify an inaccuracies, duplicative entries, or missing information. For example, if a first data record and the second data record have the same customer identifier, but the asset labels vary or one of the records is missing an asset label, then the system can determine to modify or add the asset label on one of the first data record of the second data record to match the other. In another example, if there are multiple entries that are identical and have the same timestamp, or are otherwise determined to be duplicate entries and not represent two legitimately different instances, then the system can delete or de-duplicate one of the entries or records.

The system can store the cleaned and sorted data in a database that is accessible to the system. Responsive to a request for digital output from a client device, the system can retrieve the data records. Due to the large number of data records and data files (e.g., multiple files of 2 GB for a total of 40 GB or more) that are processed in order to generate the digital output requested by the client device, the system can invoke a multi-cache approach that leverages a model trained using a machine learning technique in order to extract the relevant information from the records efficiently and store the information in a primary cache for digital output generation. Thus, by using the multi-level cache and extracting data based on a model training using a machine learning technique, systems and methods of this technical solution can reduce processor utilization, memory utilization, disk read/write or input/output actions, or other computing, storage or network resource constraints. The data processing system of the present technical solution can provide a highly-scalable real-time JAVA/TOMCAT/APACHE/JSON-based enterprise level data extraction transformation ("ETL") layer integration with highly efficient data structures for robust high volume multiple end point data processing with highly variable dynamic data sets.

The system can generate reports on various analytics, media intelligence reports, or performance metrics associated with the digital media streams, including, for example, interactions, views, or revenue. The system can further generate the reports with greater resolution such as, for example, generating performance metrics on a per show, per season or per title basis.

FIG. 1 illustrates an example system 100 for multi-level cache-based digital output generation. The system 100 can include a data processing system 102. The data processing system 102 can communicate with one or more of a computing device 128 or a remote data source 130 via a network 101. The network 101 can include computer networks such as the Internet, local, wide, metro, or other area networks, intranets, satellite networks, and other communication networks such as voice or data mobile telephone networks. The network 101 can be used to access information resources such as web pages, web sites, streaming media resources, domain names, or uniform resource locators that can be provided, output, rendered, or displayed on at least one computing device 128, such as a desktop computer, laptop computer, tablet computer, smart phone, mobile telecommunication device, or portable computers. The computing device 128 can include one or more component depicted in FIG. 4.

The network 101 can be used by the data processing system 102 to access information resources such as data objects stored in the remote data source 130, web pages, web sites, domain names, or uniform resource locators that can be provided, output, rendered, or displayed by the computing device 128. For example, via the network 101 a user of the local client computing device 128 can access information or data provided by the remote data source 130.

The network 101 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 101 may include a wireless link, such as an infrared channel or satellite band. The topology of the network 101 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 101, for example with the computing device 128 or the remote data source 130. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device. For example, the remote data source 130 can be maintained, administered or otherwise managed by a third-party entity that is different from the entity that maintains, administers or otherwise manages the data processing system 102. An entity can refer to company, organization, or individual. A third-party entity can refer to an entity that is different from the entity that administers the data processing system 102 or uses the computing device 128.

The data processing system 102 can interface with, communicate with or otherwise access one or more remote data sources 130. The remote data source 130 can include at least one logic device such as a computing device having a processor to communicate via the network 101, for example with the computing device 128 or the data processing system 102. The remote data source 130 can include one or more servers. The remote data source 130 can include one or more databases. The remote data source 130 can be housed in a data center or one or more data centers. The remote data source 130 can be hosted in a cloud-computing environment that can be geographically dispersed. Thus, the remote data source 130 can include a cloud-based video streaming service.

The remote data source 130 can include or refer to a content provider or multimedia content provider. The content can include digital content or electronically transmitted content. The content can include media or multimedia content. The remote data source 130 can provide streaming content (or content streaming services), such as streaming digital video content or streaming digital audio content. The remote data source 130 can host the content, store the content, manage or maintain the content. The remote data source 130 can provide a frontend interface for end users to access or view the content. For example, the remote data source 130 can provide a frontend webpage that an end user (e.g., via computing device 128) can access to view content. The frontend webpage can include a search engine that can receive a search query from the end user, and then provide search results for content items. The end user can either stream the content from the remote data source 130 for viewing in real-time, or can download the content for viewing at a later time.

The content can be uploaded to the remote data source 130 by various content creators or publishes. For example, content studios or entities can create videos, shows, episodes, movies, or clips, and upload them or otherwise transfer them to the remote data source 130 for delivery to end user computing devices.

The remote data source 130 can store data associated with information about the content items that are access, streamed, downloaded or otherwise interacted with. The remote data source 130 can include information about the number of content views, content interactions, performance of content items, location of a computing device 128 that accessed the content item, or revenue associated with content items. For example, advertisements or third-party sponsored content items can be displayed along with a show or episode. The remote data source 130 can include information about the third-party sponsored content item, such as whether it resulted in a selection by the end user or other conversion.

The remote data source 130 can store any performance metrics or information associated with the content item as a data object or data structure. The data object can include an identifier for the content item, a title of the content item, type of content item, label, provider of the content item, or other information associated with the content item. The data object can include, for example, performance information associated with the content item.

The offset function 126 can refer to or include a technique for storing data in the data repository. The offset function 126 can be configured to improve data security of the data repository 116 or data storage of the data processing system 102.

The data processing system 102 can include, interface, or otherwise communicate with at least one interface 104. The data processing system 102 can include, interface, or otherwise communicate with at least one data sorting component 106. The data processing system 102 can include, interface, or otherwise communicate with at least one preprocessor component 108. The data processing system 102 can include, interface, or otherwise communicate with at least one multi-level cache builder component 110. The data processing system 102 can include, interface, or otherwise communicate with at least one machine learning generator 112. The data processing system 102 can include, interface, or otherwise communicate with at least one digital output generator component 114. The data processing system 102 can include, interface, or otherwise communicate with at least one data repository 116.

The interface 104, data sorting component 106, preprocessor component 108, multi-level cache builder component 110, machine learning model generator component 112, and digital output generator 114 can each include at least one processing unit or other logic device such as programmable logic array engine, or module configured to communicate with the database repository 116 or database. The interface 104, data sorting component 106, pre-processor component 108, multi-level cache builder component 110, machine learning model generator component 112, and digital output generator 114 can be separate components, a single component, or part of the data processing system 102. The system 100 and its components, such as a data processing system 102, can include hardware elements, such as one or more processors, logic devices, or circuits.

The data repository 116 can include one or more local or distributed databases, and can include a database management system. The data repository 116 can include computer data storage or memory and can store one or more of a clean data set 118, a model 120, a first level cache 122, a primary cache 124, or an offset function 126. The clean data set 118 can refer to or include the output or result of pre-processing the data objects received from the remote data source 130. For example, the data processing system 120 can receive data objects from the remote data source 130, and then sort the data objects based on a field and pre-process the sorted data to clean the data based on a data cleansing technique, the result of which can be referred to as a clean data set. The data processing system 102 can store the clean data set 118 in the data repository 116 for subsequent processing.

The data repository 116 can include one or more models 120. The model 120 can refer to or include a machine learning model or a model 120 trained using a machine learning technique. For example, the data processing system 120 can include a machine learning model generator component 112 that trains or generates the model 120 using a machine learning technique whose input is historical data corresponding data sets and digital outputs. The data processing system 102 can use the model 120 to select or extract information from the clean data set 118 to store in the primary cache 124 in order for the digital output generator component 114 to generate digital output. The data processing system 102 can use the model 120 to determine whether the first level cache 122 is complete. For example, the model 120 can include a first model configured and trained to indicate an expected an amount of data (e.g., number of entries, records, data objects or size of the clean data set). The model 120 can include a second model configured and trained to indicate which data (e.g., data objects, fields, or values of fields) to extract from the first level cache for loading into the primary cache 124.

The first level cache 122 can refer to a type of memory such as a cache memory. The first level cache 122 can be any type of memory or storage that is designed, constructed and operational to facilitate the generation of digital output. The first level cache 122 can refer to a collection of a set of data, or a collection of an initial set of data. For example, responsive to a request for digital output, the data processing system 102 can retrieve an initial set of data from the clean data set 118, and store the initial set of data in the first level cache 122. This initial set of data may include more information than necessary in order to generate the digital output. Thus, the first level cache 122 can include extraneous or excessive information.

The primary cache 124 can refer to a type of memory such as a cache memory. The primary cache 124 can be any type of memory or storage that designed, constructed and operational to facilitate the generation of digital output. The primary cache 124 can refer to a collection of data that has been extracted from the first level cache 122. The primary cache 124 can include a subset of data that was initially stored in the first level cache 122. The subset of data that is extracted from the first level cache 122 and stored in the primary cache 124 can include data that is used to by the digital output generator component 114 to generate digital output responsive to a request for digital output from a computing device 128.

The data processing system 102 can include an interface 104 (or interface component) designed, configured, constructed, or operational to communicate with a computing device 128 and a remote data source 130 via network 101. The interface 104 can receive data objects from a remote data source 130. The interface 104 can receive and transmit information using one or more protocols, such as a network protocol. The interface 104 can include a hardware interface, software interface, wired interface, or wireless interface. The interface 104 can facilitate communication between one or more components of the data processing system 102.

The interface 104 can include or provide a user interface, such as a graphical user interface or frontend user interface. The interface 104 can provide the user interface or access to a frontend interface via computing device 128. The interface 104 can receive input from a computing device 128, such as input queries or requests. The interface 104 can provide output for presentation via the computing device 128, such as digital output, visual output, or audio output.

The interface 104 can receive information from the remote data source 130 in any format. The interface 104 can receive data objects, data records or data entries. The data objects can include one or more fields. The data objects can include or be referred to as data records or data fields. The data objects or records can be in any format, such as a comma-separated values (e.g., .CSV), an open extensible markup language ("XML") spreadsheet (e.g., XLSX), or a portable document format file (e.g., .PDF). The data objects can include fields and corresponding data entries or values with information about the video or digital asset. The fields can include, for example, a customer identifier, a video identifier, an asset label, asset title, policy information, location, timestamp, revenue, interaction, performance information, or other information or values.

The data processing system 102 can include a data sorting component 106 designed, constructed and operational to sort data objects based on a field. The data sorting component 106 can sort the data based on a field or based on multiple fields to generate a sorted data set. The data sorting component 106 can be configured with or use any data sorting technique. The data sorting component 106 can sort the data based on a field, such as an identifier field or customer identifier field, location field, asset title field, label, or other field. The data sorting component 106 can sort the data chronologically, alphabetically, or numerically. The data sorting component 106 can group objects having a same field together, such as group data objects having the same customer identifier together. The data sorting component 106 can further order the data objects based on customer identifier.

For example, the data sorting component 106 can include, use, or be configured with a daemon that performing data sorting. The daemon can be a computer program that is designed to run as a background process on the data processing system 102. The daemon can run in a background progress of an operating system, such as a Unix or Unix-like operating system. The data sorting component 106 can execute on a virtual machine in the data processing system 102. The data sorting component 106 can be configured to execute in a cloud-based virtual machine.

The data sorting component 106, or daemon, can be configured to sort data without any data sorting limit. For example, the data sorting component 106 can be configured with a sorting technique that is capable of sorting greater than 20 GB worth of data objects, or 50 GB worth of data or other amount in an efficient manner by using less memory than the amount of data being sorted. Rather than using 20 GB worth of memory to sort 20 GB worth of data objects, the data sorting component 106 can be configured to utilize only 4 GB of memory to sort 20 GB worth of data in 5 minutes, for example.

To do so, the data sorting component 106 can sort data using a data sorting technique based on a bubble sort, quicksort, timsort, or merge sort. A bubble sort can refer to a sinking sort, comparison sort, or other sorting function that can repeatedly step through a list (e.g., the list of values of the selected field in the data objects). Using a bubble sort technique, the data sorting component 106 can compare adjacent elements in the list and swap them if the elements are in the wrong order. The data sorting component 106 can repeatedly pass through the list until the list is sorted.

To improve the efficiency of the data sorting component 106 in order to sort large amounts of data (e.g., greater than 20 GB) in a short amount of time (e.g., approximately 5 minutes), while reducing computing resource utilization (e.g., using only 4 GB of memory), the data sorting component 106 of this technical solution can create a multidimensional array from the data objects or selected fields in the data objects. The data sorting component 106 can take a key-value pair and match the pair with values in the multidimensional array. The keys can include, for example, a video identifier field, customer identifier field, asset title field, or other field in the data object. Using the key-value pair, the data sorting component 106 can retrieve or identify multiple pieces of data and create a string from that data. Using the strings, the data sorting component 106 can perform a data sorting technique based on a bubble sort technique.

Thus, the data sorting component 106 can use the key-value match pair to analyze groups of data objects, and then create a hierarchy of the groups of data objects. The data sorting technique can break the data objects into groups of data objects that are 50 GB in size, and then perform a bubble sort—or other sorting technique—on the group. The data sorting component 106 can break up the data objects into manageable groups (or parts or segments). The data sorting component 106 can then sort each of the groups, and then compare each of the groups with each other until the entire set of data objects has been sorted based on a field.

The data sorting component 106 can perform the sort in real-time. Performing the sort in real-time can refer to sorting the data as it is received from the remote data source 130, or within 5 minutes of when the data is received from the remote data source 130, or 10 minutes of when the data is received from the remote data source 130. The data sorting component 106 can sort data received from multiple remote data sources 130 in real-time.

The data sorting component 106 can sort the data object to generate a sorted data set. The data sorting component 106 can store the sorted data set in the data repository 116. The data sorting component 106 can provide the sorted data set to another component of the data processing system 102 for further processing. For example, the data sorting component 106 can provide the sorted data set to the pre-processing component 108. The pre-processor component 108 can receive the sorted data set and process the data. The pre-processor component 108 can be designed, constructed and operational to clean the sorted data using one or more data cleansing policies. For example, the pre-processor component 108 can be configured with one or more of a missing data cleansing policy, a noisy data cleansing policy, or an inconsistent data cleansing policy.

The pre-processor component 108 can clean the sorted data using a missing data cleansing policy. The missing data cleansing policy can refer to identifying a data object that is missing a value for a field, and then attempting to generate a value for the field and updating the field with the generated value. For example, both a first data object and a second data object can include the following fields: {customer ID, video ID, title, duration, location}. The first data object can include values for all of these fields. However, the second data object may lack a value for the "title" field. Using the missing data cleansing policy, the pre-processor component 108 can determine that the following fields of the first and second data objects match: customer ID, video ID, duration, and location. The pre-processing component 108 can determine that while the second data object lacks a value for the "title" field, the remaining fields of the second data object match the fields of the first data object. Using the missing data cleansing policy, the pre-processor component 108 can determine to generate a value for the "title" field of the second data object based on the value of the "title" field in the first data object. For example, the missing data cleansing policy can indicate that if the video ID field and customer ID field are the same between two data objects, then it is highly likely that the "title" field is also be the same. The pre-processor component 108 can then generate a clean data set that includes a second data object with the value for the "title" field determined from the first data object.

The first data object can be received in real-time or together with the second data object. The first data object can be stored in data repository 116. The first data object can be part of a historical set of data objects. The data processing system 102 can include a historical model generated based on historical data objects. For example, the data processing system 102 can receive one or more data objects having the same customer ID, video ID, title and duration. The data processing system 102 can generate a historical model for the data object that includes the same values for the fields customer ID, video ID, title and duration based on receiving a certain number of data objects within a time interval having matching values for these fields. By establishing a historical model for the data object, the data processing system 102 can apply the missing data cleansing policy on subsequent data objects to identify fields lacking values and then generate values for those fields using the historical model.

The data processing system 102 can generate the historical model for a data object based on receiving a predetermined number or percentage of data objects having the same values for certain fields within a predetermined time interval. The predetermined number can be, for example, 5, 10, 15, 20, 25, 30, 50, 100, 200, 500 or more such that it that conveys a high likelihood that the values of the fields are accurate. The predetermined percentage can be, for example, 70%, 80%, 85%, 90%, 95%, or more such that it conveys a high likelihood that the values of the fields are accurate. The predetermined time interval can be, for example, the last 24 hours, 48 hours, 72 hours, 1 week, 2 weeks, 30 days, 60 days, 90 days or more such that it conveys a high likelihood that the values of the fields are current and accurate. For example, the data processing system 102 can establish the historical model for a data object if 90% of data objects that have a certain customer ID and video ID within the last 72 hours also have the same value for the title field.

The missing data cleansing policy can be configured to generate values for certain fields that are appropriate. For example, the missing data filed can generate values for the title field, but may not generate values for the location field because the data processing system 102 may not be able to leverage historical data to generate a location value with a high likelihood since the computing device 128 can be located in any geographic location.

In some cases, the missing data cleansing policy can generate values using a statistical technique. For example, the pre-processor component 108, using the missing data cleansing policy, can apply a statistical technique to historical values for the field to generate an estimate or predicted value for the field. The statistical technique can be determining an average, mean, median, highest value, or lowest value, for example. The statistical technique can include determining a standard deviation for the value of the field, and providing a range for the field.

Thus, the pre-processor component 108 can apply the missing data cleansing policy to the sorted data set to identify one or more entries in the sorted data set that lack values for a field of the plurality of fields, and determine, based on a historical model of values for the second field, one or more values for the second field of each of the one or more entries. The pre-processor component 108 can generate the clean data set with the one or more values for the second field determined based on the historical model of values for the second field.

The pre-processor component 108 can apply a noisy data cleansing policy to clean the sorted data. The pre-processor component 108 can apply the noisy data cleansing policy in addition to the missing data cleansing policy, or instead of the missing data cleansing policy. Noisy data can refer to instances where the data processing system 102 determines that multiple data records should have the same values for certain fields, but there is a mismatch between the values for the fields. For example, if the customer ID and video ID fields of 10 data objects are the same, but the title varies, the pre-processing component 108 can determine there is noisy data. The pre-processor component 108 can detect that values for one field varies among data objects, whereas values of other fields of data objects remain constant. The pre-processor component 108 can further determine, based on the noise data cleansing policy, that the values of the field that vary should not vary and, therefore, determine that the field has noisy data. For example, the noise data cleansing policy can indicate that values for a title field or duration field should not vary since they are an immutable property of the content item.

Upon identifying the noise data, the pre-processor component 108 can determine to clean the noisy data. The data processing system 102 can clean the noisy data by removing the data objects containing noisy data, remove the fields containing noisy values, or modify the noisy values so as to clean the data object. If the pre-processor component 108 can determine with a high likelihood what the correct value of the field should be, then the pre-processor component 108 can modify the noisy value so as to match the correct value. The pre-processor component 108 can determine the correct value based on the historical model, for example, that can be used by the missing data cleansing policy. The pre-processor component 108 can determine the correct value based on the value of the field that is used in the majority of data objects.

If, however, the pre-processor component 108 cannot determine with a high likelihood what the correct value of the field should be (e.g., if there is no historical model for the value of the field, or if the pre-processor component 108 cannot determine with high confidence what the correct value for the noisy field is based on the received data objects), then the pre-processor component 108 can determine to remove the noisy data objects (or data records). For example, the pre-processor component 108 can determine that video identifier field of two different data records have the same values. However, the pre-processor component 108 can determine that the title field of these same two data records have different values. Responsive to detecting the mismatch between the title fields of these two data records, the pre-processor component 108 can determine to remove the data records from the sorted data set into to generate the clean data set without these data records. Thus, the pre-processor component 108 can determine that a first entry (or data record or data object) in the sorted data set that contains a first value for the field of the plurality of fields, and a second value for a second field of the plurality of fields. The pre-processor component 108 can determine that a second entry in the sorted data set that contains the first value for the field of the plurality of fields, and a third value for the second field of the plurality of fields, the third value different from the second value. The pre-processor component 108 can determine to remove, responsive to identification of a mismatch between the second field of the first entry and the second field of the second entry and a match between the field of the first entry and the first field of the second entry, the first entry and the second entry from the sorted data set to generate the clean data set without the first entry and the second entry.

The pre-processor component 108 can apply an inconsistent data cleansing policy. The pre-processor component 108 can apply the inconsistent data cleansing policy instead of one of or both of the missing data cleansing policy and the noisy data cleansing policy. The pre-processor component 108 can apply the inconsistent data cleansing policy in addition to the missing data cleansing policy and the noisy data cleansing policy. The inconsistent data cleansing policy can refer to identifying data objects that are duplicative and removing the duplicative data objects or data records. The inconsistent data cleansing policy can refer to or include a deduplication technique.

For example, the pre-processor component 108 can apply the inconsistent data cleansing policy to the sorted data set to identify a first entry that matches a second entry. The pre-processor component 108 can remove one of the first entry or the second entry from the sorted data set to generate the clean data set without the one of the first entry or the second entry.

The pre-processor component 108 can store the clean data set in the data repository 116 as clean data set 118. To improve data security and keep the clean data set secure and inaccessible to malicious actors or prevent unauthorized use or access, the data processing system 102 can store the clean data set 118 in the data repository 116 in a secure manner. For example, the data processing system 102 can store the clean data set 118 based on a function (e.g., offset function 126) that generates an offset value to reference a pointer value in the data repository 116. The offset function 126 can refer to or include a technique for storing data in the data repository. The offset function 126 can be configured to improve data security of the data repository 116 or data storage of the data processing system 102.

The data processing system 102 can use the offset function 126 to generate an offset number, value or address in memory (or database or the data repository 116). The offset number can reference an N-digit. The data processing system 102 can store the clean data set or one or more data objects of the clean data set at a point in an index corresponding to the N-digit referred to by the offset number. The N-digit can be a 10-digit value, 14-digit value, 20-digit value, 30-digit value, 36-digit value, or other N-digit that can facilitate secure data storage. Thus, the data processing system 102 can create a database within a database and to store the clean data set 118 in a secure manner. Further, by using an offset function 126 to generate an offset value for an index, the data processing system 102 can securely data while maintaining efficiency and speed of read/write operations to the data repository 116.

The data processing system 102 can use the offset function 126 to store any type of data to the data repository 116. One or more component of the data processing system 102 can be configured to use the offset function 126 to read/write data from/to the data repository 116. For example, the interface 104 can read/write data from/to the data repository 116 using the offset function 126. The data sorting component 106, multi-level cache builder component 110, or other component can read/write data from/to the data repository 116.

Thus, the data processing system 102 can apply one or more data cleansing techniques to the sorted data set in order to generate a clean data set. The pre-processor component 108 can convert the data objects received from the remote data source 130 into a clean data set format that is suitable for input into a machine learning model generator component 112. The clean data set generated or output by the pre-processor component 108 can be input into a machine learning engine or used to train a machine learning model. For example, the data objects received from the remote data source 130 may not be in a format that is compatible for input into a machine learning model generator component 112. The machine learning model generator component 112 can expect data to be input in a numerical form, whereas the data objects can have values that are strings or characters.

The data processing system 102 can generate digital output based on the data objects received from the remote data source 130. The data processing system 102 can receive a request for digital output. The data processing system 102 can receive a request from a computing device 128, which can be referred to as a client device 128. The data processing system 102 can request for a type of digital output. The type of the digital output can be based on the data objects received from the remote data source 130. The data processing system 102 can be configured to generate various types of digital output. For example, the data processing system 102 can generate a report as digital output. The data processing system 102 can generate the report with information about how digital content performs. The data processing system 102 can generate the report with performance metrics associated with digital content.

FIG. 5 depicts an example report 500 generated by the data processing system 102. The report 500 can include one or more columns, such as customer identifier, asset identifier, video title, usage views, usage partner-provided revenue, user generated content ("UGC") views, UGC match revenue, digital streaming premium revenue, total views, and total revenue. The rows of the column can correspond to different videos. Each video can have its own customer identifier, asset identifier, and video title.

FIG. 6 depicts an example report 600 generated by the data processing system 102. The report 600 can include one or more columns, such as show tag, show name, total, no season, season 1, season 2, season 3, season 4, season 5 and season 6. The rows of the column can correspond to different shows that can each have one or more seasons associated with the show. Each show can have each its own revenue or other totals.

To generate the digital output or report, the data processing system 102 can load some or all of the clean data set to a first level cache 122 of the data processing system 102. The data processing system 102 can include a multi-level cache builder component 110 designed, constructed and operational to load data to the first level cache 122. The multi-level cache builder component 110 can load at least a portion of the clean data set to the first level cache 122 responsive to the request from the computing device 128 for the digital output. The multi-level cache builder component 110 can load the portion of the clean data set that corresponds to the customer identifier associated with the computing device 128 making the request for the digital output or report. In some cases, the request can indicate parameters for the report. The report can indicate a time interval, such as the last 30 days, 60 days, 90 days, or other time interval. The multi-level cache builder component 110 can load the portion of the clean data set to the first level cache 122 that corresponds to the time interval and the customer identifier. In another example, the parameter can include a location, such as a geographic region, country, state, or city. The multi-level cache builder component 110 can load the portion of the clean data set corresponding to the requested geographic region and the customer identifier.

The multi-level cache builder component 110 can load, to the first level cache 122, portions of the clean data set 118 in real-time. Loading data in real-time can refer to loading portions of the clean data set responsive to the request for digital output and as data is being stored in the data repository 116. In some cases, due to the large size of the clean data set 118, the multi-level cache builder component 110 can load multiple portions of the clean data set 118 in a serial manner or as parallel threads.

The clean data set 118 may not be complete, or may not contain all the available data, at the time the request for digital output is received by the data processing system 102. The data processing system 102 can query the remote data source 130 for data objects responsive to the request for digital output received from the computing device 128. The data processing system 102 can receive the data objects from the remote data source 130 responsive to the request. The data processing system 102 (e.g., via the data sorting component 106 and pre-processor component 108) can generate the clean data set 118 as the data processing system 102 receives data objects from the remote data source 130. Thus, the multi-level cache builder component 110 can continue to load relevant portions of the clean data set 118 to the first level cache 122 as the data processing system 102 receives the data objects and cleans the data objects.

The multi-level cache builder component 110 can extract relevant portions of the data loaded in the first level cache 122, and then load the extracted relevant portions to the primary cache 124. The primary cache 124 can include a subset of data loaded in the first level cache 122. The data processing system 102 can use the primary cache 124 to generate the digital output or reports. For example, the clean data set 118 can contain a large amount of data which can result in inefficient or wasted computing resource utilization if the data processing system 102 attempts to generate a report based on the full set of data. Furthermore, generating the digital output can include multiple read/write or input/output actions performed on the data repository 116 or the clean data set 118. Depending on the type of performance metrics to be included in the report, various fields in data objects can be accessed and combined or manipulated using various techniques to generate performance metrics for inclusion in the digital output. Due to the complex nature of the digital output, it may not be apparent which fields or values in data objects may be used to generate the digital output. However, accessing the entire clean data set 118 to generate the report may be unnecessary. Further, due to the large size of the full clean data set 118, the data processing system 102 may not include a large enough cache memory to load the entire clean data set 118 to cache. Cache memory may be faster than the type of storage used to store the clean data set 118. The data processing system 102 may have a limited amount of cache memory that may not be sufficient to store the entire clean data set 118. Thus, the clean data set 118 can be in a type of storage (e.g., a hard disk drive or solid state drive) that may be slower (e.g., with regard to read/write speeds) as compared to the first level cache 122 or the primary cache 124. To reduce the amount of time taken to generate the report, as well as reducing memory and processor utilization, the multi-level cache builder 110 can extract relevant portions of the clean data set 118 loaded in the first level cache 122, and then load the extracted relevant portions to the primary cache 124.

To determine what portions of the data to extract from the first level cache 122, the multi-level cache builder component 110 can use a machine learning model. The machine learning model can indicate what data to extract in order to reduce or minimize the amount of data loaded into the primary cache 124 without negatively impacting accuracy or robustness of the report. For example, the machine learning model can indicate which fields of a data object to extract from the first level cache 122 and load into the primary cache 124.

The multi-level cache builder component 110 can select a model 120 based on the requested type of digital output. The data repository 116 can store multiple models 120 that have been trained based on historical data and types of digital reports. The model 120 can be trained and configured to receive, as input, a type of digital output, and output corresponding fields used to generate the type of digital output.

The data processing system 102 can include machine learning model generator component 112 designed, configured and operational to generate one or more models trained using historical data, types of digital output, and digital output. The machine learning model generator component 112 can generate a model that can be used by the data processing system 102 to determine, based on the type of digital output and the corresponding digital output, what data is used to generate the digital output. The data processing system 102 can use the model 120 generated by the machine learning model generator component 112 to determine, based on the type of digital output and the corresponding digital output, which fields in data objects are used to generate the digital output. For example, the machine learning model generator component 112 can receive a historical clean data set 118, and a type of digital output. The machine learning model generator component 112 can identify a cache hit ratio to determine which fields in the clean data set 118 are accessed by the digital output generator 114 to generate the digital output. The machine learning model generator component 112 can then indicate, based on the type digital output, which fields from a clean data set 118 are used and, therefore, should be extracted from the first level cache 122 and loaded to the primary cache 124 to expedite digital output generation in real-time while reducing memory and processor utilization.

To do so, the machine learning model generator component 112 can include or be configured with one or more machine learning techniques to train the model 120. For example, the machine learning model generator component 112 can use a K-nearest neighbor ("k-NN") technique. The k-NN technique can refer to a non-parametric technique configured for classification. The input to the machine learning model generator component 112 can include the k closest training examples in a feature space. The output of the machine learning model generator component 112 can include a class membership. An object can be classified by a plurality vote of its neighbors, with the object being assigned to the class most common among its k nearest neighbors.

The types of digital outputs can be established by an administrator of the data processing system 102, a customer or associated with the computing device 128, or an administrator of the remote data source 130, for example. For example, the data processing system 102 (e.g., via interface 104) can provide an interactive graphical user interface for display via the computing device 128 (e.g., client device). The interactive graphical user interface can include widgets, elements, buttons, input text boxes, drop down menus or other graphical user interface elements. The data processing system 102 can receive, via the interactive graphical user interface, one or more selections or input that indicates performance metrics or other information to be included as part of a digital output or report generated by the data processing system 102. The performance metrics can include, for example, revenue associated with digital content items, clicks, conversions, selections, location of views, or other information associated with activity associated with streaming digital content items. The data processing system 102 can train or generate the machine learning model configured for the type of digital output pursuant to the indications via the graphical user interface.

The data processing system 102 can train the model 120 in an offline process or online process. For example, the data processing system 102 can train the model 120 offline or in a backend process so as to have a trained model ready for processing in responsive to a request for digital output. In some cases, the data processing system 102 can train or generate the model in real-time responsive to a request for digital output. In some cases, the data processing system 102 can have multiple models configured or trained, and can update or continue to train the models as new data is received and in an offline manner, such as on a nightly basis or based on another time interval.

To train the model, the machine learning model generator component 112 can receive, as input, data objects that have been sorted or cleaned. For example, the machine learning model generator component 112 can take, as input, the clean data set 118. The machine learning model generator component 112 can, using k-NN, determine a cache hit ratio in order to determine which data is used by the data processing system 102 (e.g., the digital output generator component 114) to generate the digital output or report. The machine learning model generator component 112 can use a k-NN clustering technique to determine which portions of the clean data set 118 are used by the digital output generator component 114 to generate a report. The k-NN clustering technique can refer to or include a supervised classification function that can provide new data points according to the k number or the closest data points. In some cases, the machine learning generator component 112 can be configured with a k-means clustering technique, which can include an unsupervised clustering algorithm configured to gather and group data into k number of clusters. Thus, the machine learning model generator component 112 can be configured to generate a model 120 using or based at least in part on a k-nearest neighbors function or a k-means clustering function.

The data processing system 102 can generate the model 120. The machine learning model generator component 112 can generate the model 120 used to generate the primary cache 124, which can be referred to as the ML primary cache learning model. The ML primary cache learning model 120 can be the output of the training process. For example, the machine learning model generator component 112 can use one or more machine learning functions to identify the patterns in the training dataset which is used to approximate the target function that can map the inputs to the outputs from the available dataset. To do so, the data processing system 102 can use classification. For example, the data processing system 102 can use classification predict the type or class of an object within a finite number of options. The output variable for classification can be a categorical variable.

With the output variable, the data processing system 102 can use one or more of: K-Nearest neighbors' function, logistic regression (e.g., linear model for binary classification), decision Tree (e.g., 'If Else' based classifier, more robust to outliers), or ensembles (e.g., combination of multiple machine learning models clubbed together to improve results).

The data processing system 102 can use clustering. For example, the data processing system 102 can group similar objects together in order to facilitate identifying similar objects automatically. To perform clustering, the data processing system 102 can use one or more of the following: K means++—Modified version of K means, or DBSCAN—Density-based clustering algorithm.

The data processing system 102 can perform dimensionality reduction. The data processing system 102 can implements a form of "Dimensionality" that is the number of predictor variables used to predict the independent variable or target. often. Due to the large number of variables in a dataset and the negative consequences resulting from overfitting to the models, the data processing system 102 can determine that not all variables contribute equally towards the goal and in a large number of cases, the data processing system 102 can preserve variances with a lesser number of variables. Thus, the data processing system 102 can achieve a significant dimensionality reduction.

The data processing system 102 can select a machine learning model 120 to determine what information to load into the primary cache 124. The data processing system 102 can select a model 120 based on the type digital output or report requested by the computing device 128. For example, the multi-level cache builder component 110 can receive an indication of the type of digital output or report requested by the computing device 128 as well as an indication of the clean data set 118. The multi-level cache builder component 110 can select a model 120 trained by the machine learning model generator component 112. The multi-level cache builder component 110 can input the indication of the type of digital output and an indication of the clean data set 118 (e.g., indication of the available fields in the clean data set 118) into the model 120. The model 120 can output the fields or data that is to be stored in the primary cache 124. The multi-level cache builder component 110 can extract the values of the corresponding fields stored in the first level cache 122, and load the extracted values into the primary cache 124. In some cases, the multi-level cache builder component 110 can input the actual clean data set 118 or contents of the clean data set 118 and the type of digital output, and the output of the model 120 can be loaded into the primary cache 124. Thus, the multi-level cache builder component 110 can identify an output of the machine learning model 120 that indicates the subset of fields to be loaded to the primary cache 124, and load the values of the subset of fields into the primary cache 124. The multi-level cache builder component 110 can load, responsive to the request, the primary cache 124 with a subset of fields stored in the first level cache 122 selected based on the machine learning model 120 configured for the type of digital output.

The multi-level cache builder component 110 can determine that the primary cache 124 is ready for the digital output generator component 114 to generate the digital output. The multi-level cache builder component 110 can determine that the primary cache 124 is complete and includes the data to generate the requested digital output or report. For example, the multi-level cache builder component 110 can determine that the first level cache 122 is complete. Responsive to the indication that the first level cache 122 is complete, the multi-level cache builder component 110 can determine that there is no additional data available for extraction from the first level cache 122 for loading into the primary cache 124. The multi-level cache builder component 110 can receive the indication from the pre-processor component 108 or other component of the data processing system 102 that the first level cache 122 is complete. In some cases, the data processing system 102 can receive an indication from the remote data source 130 that all available data has been provided to the data processing system 102. Thus, once the multi-level cache builder component 110 determines that the first level cache 122 is complete, the multi-level cache builder component 110 can complete extracting data from the first level cache 122, and complete loading the primary cache 124. The multi-level cache builder component 110 can provide, responsive to completion of loading the primary cache 124, an indication to the digital generator component 114 to generate the digital output or report.

The data processing system 102 can include a digital output generator component 114 designed, constructed and operational to generate digital output. The digital output generator component 114 can generate digital output responsive to a request for digital output. The digital output generator component 114 can generate the digital output responsive to a request from a computing device 128 or user for digital output. The digital component generator component 114 can generate digital output based on an event, condition or trigger. For example, the digital component generator component 114 can be configured to generate digital output based on a time interval, such as every 24 hours, 48 hours, 72 hours, 1 week, 2 weeks, 30 days, 60 days, 90 days or other time interval. The digital component generator component 114 can be configured got generate digital output responsive to an instruction or command from the remote data source 130 or administrator of the data processing system 102. The digital output generator component 114 can transmit the digital output to a computing device 128. The digital output generator component 114 can transmit the digital output to the computing device 128 via network 101. The digital output generator component 114 can transmit the digital output to the computing device 128 to cause the computing device 128 to present, render or otherwise provide the digital output to a user of the computing device 128. For example, the computing device 128 can display the digital output via a display device communicatively coupled to the computing device 128.

The digital output can include any type of output in any format. The digital output can convey performance information associated with digital streaming content or other digital content. For example, the digital output can include a report that indicates a number of views of the digital content, revenue associated with the digital content, performance of the digital content or other performance associated with the digital content. The digital content can be provided by a customer associated with a customer identifier. The customer can be referred to as a user of the computing device 128. The customer can be a customer of an entity that provides, administers or manages the data processing system 102. The customer may have provided, produced, developed, or uploaded the digital content items to the remote data source 130 for presentation to other end users. The report or digital output can be in any format, including, for example, a spreadsheet, graphs, pie charts, numbers, text, alphanumeric values. The digital output can be presented in an web page such as via hypertext markup language, an electronic document, or in an electronic message.

The digital output generator component 114 can access the data in the primary cache 124 and process the data in the primary cache 124 to generate the digital output or report. The digital output generator component 114 can be a post-processor of the data stored in the primary cache 124. In some cases, all the data used to generate the digital output or report can be obtained from the primary cache 124. The digital output generator component 114 can generate the digital output or report by retrieving the data stored in the primary cache 124 and without separately accessing any data stored in the first level cache 122, the clean data set 118, or the remote data source 130. Thus, this technical solution can reduce memory utilization, processor utilization, network utilization, and input/output or read/write actions by storing only the data necessary for report generation in the primary cache 124 and the digital output generator component 114 accessing only the primary cache 124 to generate the digital output or report. The digital output generator component 114 can provide status updates while processing the data in the primary cache 124 to generate the digital output or report.

The data processing system 102 can include post-processing code running in an application server (e.g., a Tomcat java application server for servlets) that communicates with a backend claim process machine learning Unix daemon. The data processing system 102 can communicate via a non-blocking queue to notify the java client to start pulling the produced desired report output based on the data assembled and correlated by the data processing system 102. Then the notified client can begin abstracting the consolidated data from the claim processor associated database. This consolidation can then be further processed to produce the output report based on the corresponding reporting output detailing column headers and corresponding data in CSV, PDF, and MS Excel spreadsheet formatted output, as depicted in FIGS. 5 and 6, for example.

After the data processing system has generated the digital output or report and presented the digital output to the computing device 128 responsive to the request, the data processing system can clear one or more of the primary cache 124 or first level cache 122. In some cases, the data processing system can leave the data in the first level cache 122 and primary cache 124 until the data processing system receives a new or second request for digital output. The second request can be for a different customer or user. The second request can be for a different type of digital output and use different data objects. Thus, responsive to a subsequent request from the client, the data processing system can clear the primary cache and then reload the primary cache responsive to the second request with portions of a clean data set that correspond to the second request.

Figure 2:
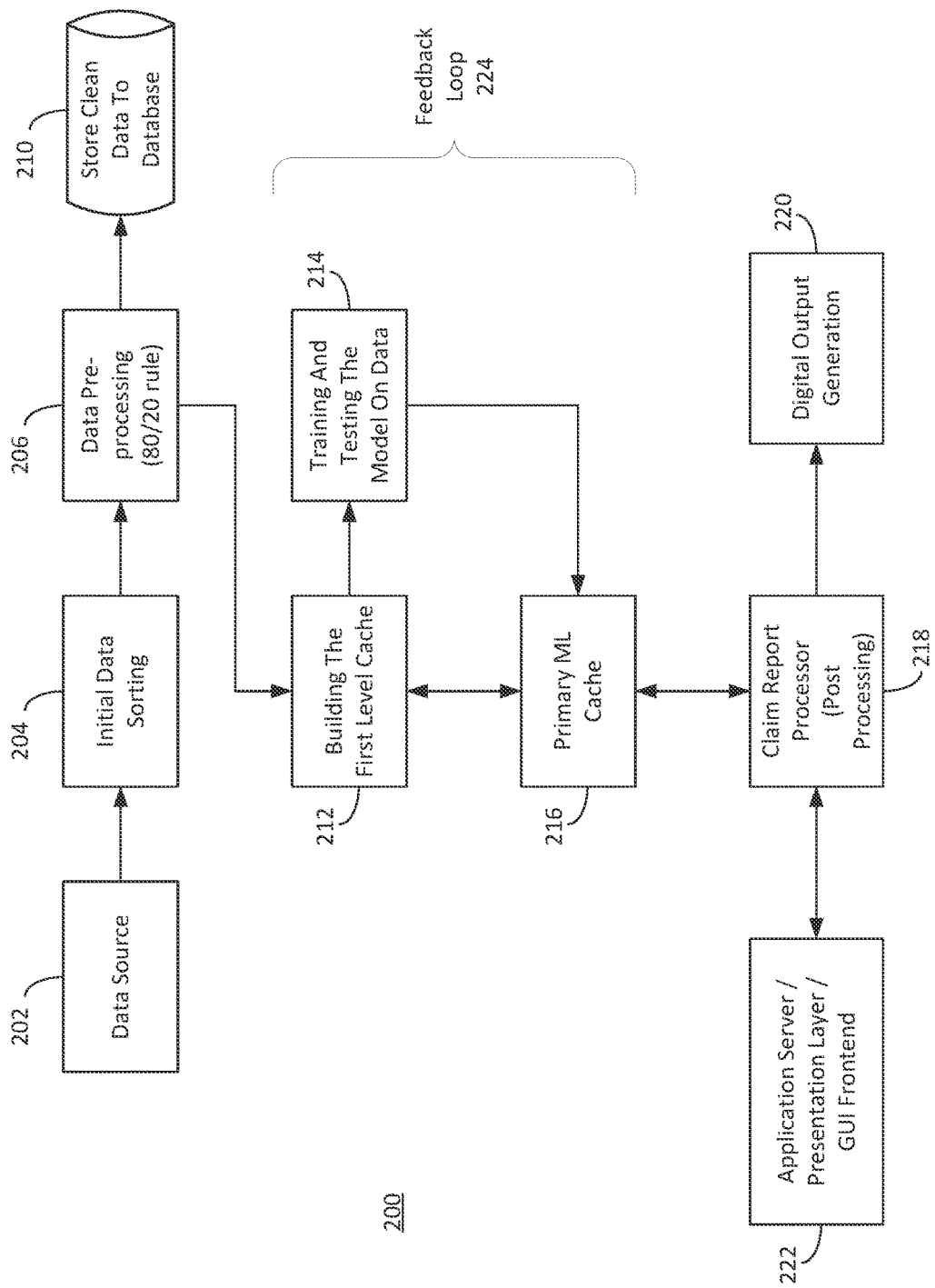
FIG. 2 is an illustration of an example of an operational flow for multi-cache based digital output generation, in accordance with an implementation.

FIG. 2 is an illustration of an example of an operational flow for multi-cache based digital output generation, in accordance with an implementation. The process 200 can be performed by one or more system or component depicted in FIG. 1 or FIG. 4, including, for example, a data processing system, data sorting component, pre-processor component, multi-level cache builder component, machine learning generator, or digital output generator component. At ACT 202, a data source can provide data or data objects. The data source can be a remote data source, such as a provider of digital streaming content. The data source can include a cloud-based digital streaming service. One or more data sources can provide the data. For example, there may be multiple cloud-based digital streaming services that stream digital content provided by a customer. The data source can provide the data via a network to a data processing system for processing. The data source can provide the data in real-time, which can refer to providing the data as the data becomes available. The data source can provide the data based on a time interval, such as periodically, daily, hourly, weekly, monthly, or other time interval. The data source can provide the data responsive to a request for data. The data source can provide the data based on a condition, event or trigger. For example, the data source can provide the data when there is a certain amount of data available, such as a certain amount of gigabytes of data (e.g., 1 GB, 2 GB, 4 GB, etc.). The data source can provide the data based on a performance threshold, such as number of presentations of the digital content or amount of revenue generated based on the digital content of the customer. The data source can provide the data in any format, including, for example .csv, .xlxs, or .pdf.

At ACT 204, the data processing system can receive the data objects from the data source and perform initial data sorting. For example, a data sorting component can perform initial data sorting. The data processing system can sort the data objects based on a field in the data objects, such as customer identifier, video identifier, title, location, or other field in the data object. The data processing system can use any technique to sort the data, including, for example, a bubble sort or some other sorting technique that can be based on a bubble sort function.

At ACT 206, the data processing system can perform pre-processing on the sorted data. The data processing system can pre-process the sorted data and create a clean data. Pre-processing or cleaning the data can refer to or include identifying problems, issues, inconsistencies or missing data, and remedying them. The data processing system can use one or more pre-processing techniques or policies. For example, the data processing system can deduplicate the data. The data processing system can remove redundant entries duplicative entries.

In another example, the data processing system can identifying missing fields or values in the data objects. Upon identifying a missing value from a data object, the data processing system can apply a missing data policy or technique to generate a value for the field, and populate the field of the data object with the generated value. The data processing system can use any technique to generate the missing value. The data processing system can estimate or predict the missing value based on historical data. For example, the data processing system can predict, based on historical data that matches or identified as being similar to the data object with the missing value, a value for the missing value. In another example, the data processing system can identify another data object having similar values for fields. The data processing system can determine, using the missing data policy, that if values of certain fields match between two data objects, then the field with the missing value is likely to have a value that corresponds to the other data object.

The data processing system can generate, estimate, or predict the missing value based on a statistical technique. For example, the data processing system can populate the field with the missing value with an average, mean, mode, or median value for field based on the remaining data objects or based on other similar data objects. Thus, the data processing system can generate a clean data set using one or more techniques and based on the sorted data set.

At ACT 210, the data processing system can store the clean data set in a database. The data processing system can store the clean data set at an index in the database. To improve data security and prevent malicious or unauthorized access to the clean data set, the data processing system can store the clean data set using an offset function to compute an offset digit used to reference an index value in the database, thereby creating a database within a database. The data processing system can store the clean data set in the database for further processing. The data processing system can update the clean data set as new data is received from the data source at ACT 202. For example, the data source or remote data source can provide data objects to the data processing system in real-time or based on a time interval. Responsive to receipt of data objects from the remote data source, the data processing system can sort the data objects, pre-process the data objects to generate a clean data set, and update the clean data set stored in the database with the additional clean data set.

At ACT 212, the data processing system can receive, access, retrieve or otherwise obtain the clean data set from the database and build the first level cache. The data processing system can obtain the clean data set and build a first level cache with the clean data set responsive to a request for digital output or a report. For example, the data processing system can receive a request for a report, and responsive to the report, retrieve a corresponding clean data set. The clean data set can correspond to a customer identifier associated with the request for the report.

In some cases, the data processing system can receive, at ACT 222, an indication of the type of report to generate. The data processing system can include or provide an application server that can provide a graphical user interface ("GUI") frontend via a presentation layer for rending on a client computing device. The data processing system can receive, via the GUI frontend, the request for the digital output.

The data processing system can enter a feedback loop 224 which can include building the first level cache at ACT 212, training and testing the model on data at ACT 214, and establishing the primary machine learning ("ML") cache at ACT 216. The data processing system can enter the feedback loop 224 responsive to the request for the digital output. The data processing system can iterate through the feedback loop 224 until the data processing system receives an indication that the first level cache is complete.

The data processing system can build the first level cache with the clean data set. The first level cache can represent an input pipe that stores one or more portions of the clean data set as it is retrieved from the database. At ACT 214, the data processing system can train and test the model on the received data. The data processing system can use a machine learning model to determine whether all of the data has been received and stored in the first level cache. For example, the machine learning model can output whether or not additional data is available. For example, if 10,000 data objects were previously received for a similar type of report, then the data processing system can determine that 10,000 data objects should be received for the current request as well. Thus, the data processing system can train a model, using a machine learning technique, to determine whether all the data objects have been received based on the type of digital output requested or the customer that is requesting the digital output. In some cases, the data processing system can train the model based on data objects and reports generated for similar customers in order to predict the number of data objects to be expected for a type of report for a similar customer.

The data processing system can iterate through the feedback loop 224 until all data has been received. At ACT 216, the data processing system can extract relevant portions of data from the first level cache and load the relevant portions into the primary ML cache. The data processing system can use a machine learning model to load the primary ML cache. The data processing system can use the ML model to determine which portions of data to extract from the first level cache and load into the primary ML cache. The model can be trained based on historical data objects and reports generated by the data processing system to identify a cache hit ratio corresponding to fields in the data objects that are accessed to generate a type of report.

Figure 7:
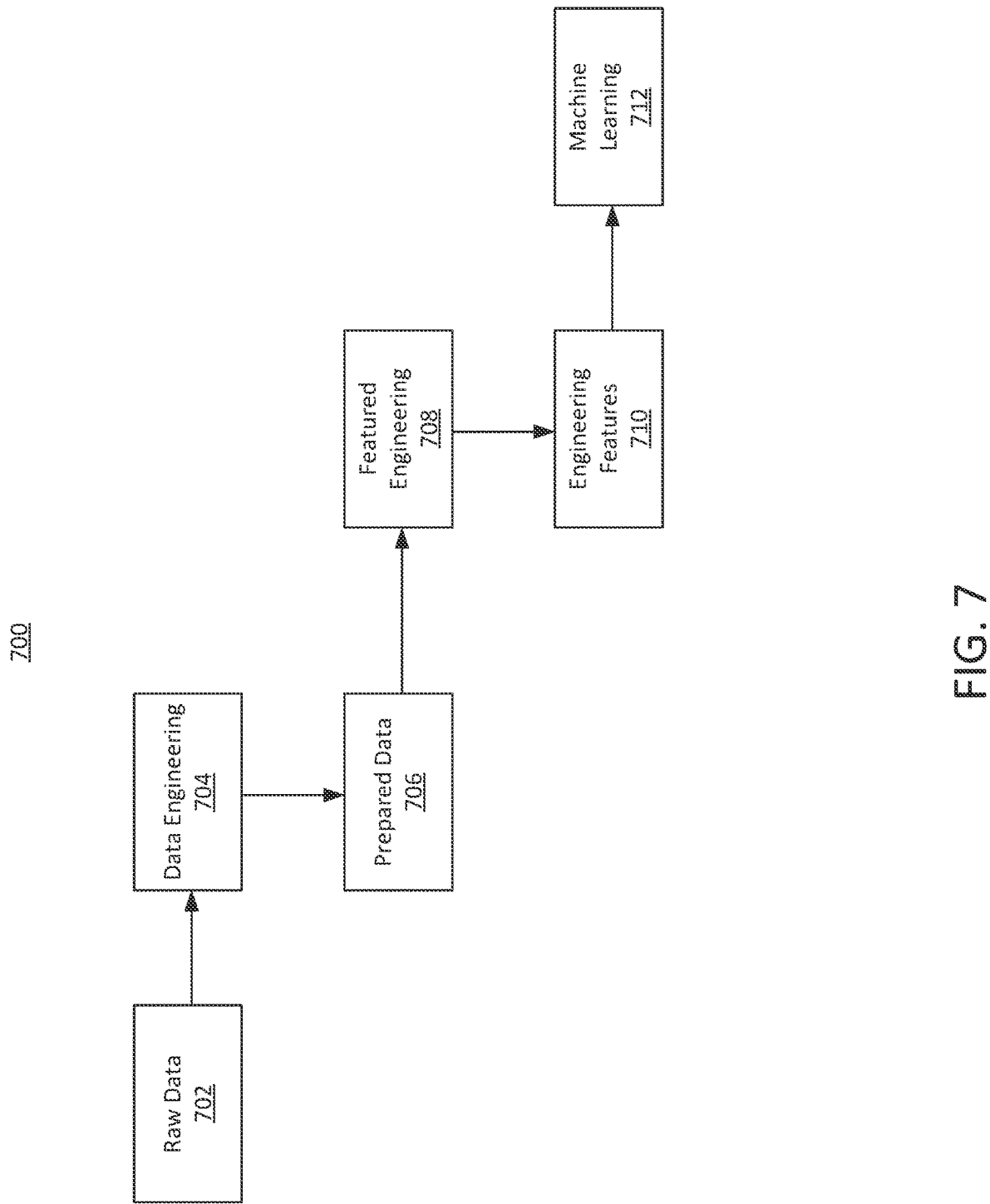
FIG. 7 depicts a method of processing raw data for input into a machine learning model, in accordance with an implementation.

The data processing system can use one or more models trained using one or more machine learning techniques. The data processing system can use a first model to determine whether all data has been obtained and loaded into the first level cache. The data processing system can use a different, second model to determine what data to load into the primary cache. The two models can be trained using the same or different machine learning techniques. The two models can be trained using input including one or more of historical data objects, historical clean data sets, type of digital output or customer identifiers. The data processing system can train the models to provide different types of output. For example, the data processing system can train the first model to predict whether all data has been received for to generate a digital output; for example, whether the first level cache is complete. The data processing system can train the second model to determine what data to extract from the first level cache and be loaded into the primary ML cache. FIG. 7 depicts a method including the data processing system receiving raw data to generate a model trained using a machine learning technique.

At ACT 218, the data processing system can perform post processing on the data in the primary ML cache. The data processing system can proceed to ACT 218 upon determining that the first level cache is complete and the data to be used to generate the digital output has been loaded to the primary ML cache. The data processing system can begin processing the data to generate digital output.

The data processing system can perform post processing, which can include data mining the results created and "learned" by the primary ML cache where source data is now in a "clean/engineered" state permits the frontend post processor to extract elements/columns of data to produce the desired reporting data output. This report can include of a subset of data based on 'search criteria' to produce the report desired, or may involve a very large dataset from the primary cache coupled to 'supplementary data' supplied by the claim processor associated database. The data processing system can post-process this conjunction of data in to the final output report. This data is obtained via a non-blocking queue which is memory resident. Data stored in the primary ML cache can be 100% memory based, that permits very fast processing speeds. The data processing system can encounter a very high percentage cache-hit ratio due to the design and nature of the data "present" in the ML primary cache. The data processing system can regularly hit data report requirements over 95% hit-positive ratio, if not database data supplemental access may be required.

The data processing system, when performing post-processing to generate a report, can utilize the primary ML cache which can continue to operate and hold contiguous/preprocessed data, and can add to its own pool of "learned/clean/engineered" data memory store. The data processing system can drop data that is marked as 'stale' from the ML primary cache, thereby freeing up memory in the cache. This data is however not lost to the claim processor but stored in the associated database. Data can be determined to be stale based on a state of the data. By controlling the data, the data processing system can protect the primary cache against data inconsistency, thereby increasing the effectiveness of the primary cache.

At ACT 220, the data processing system can generate digital output or a report. The report can be in any form that is suitable for presentation to a user via a computing device. The report can include information associated with the data objects received from the remote data source. The report can include, for example, performance metrics such as revenue, activity, views, impressions or other information associated with digital content streamed to end users.

Figure 3:
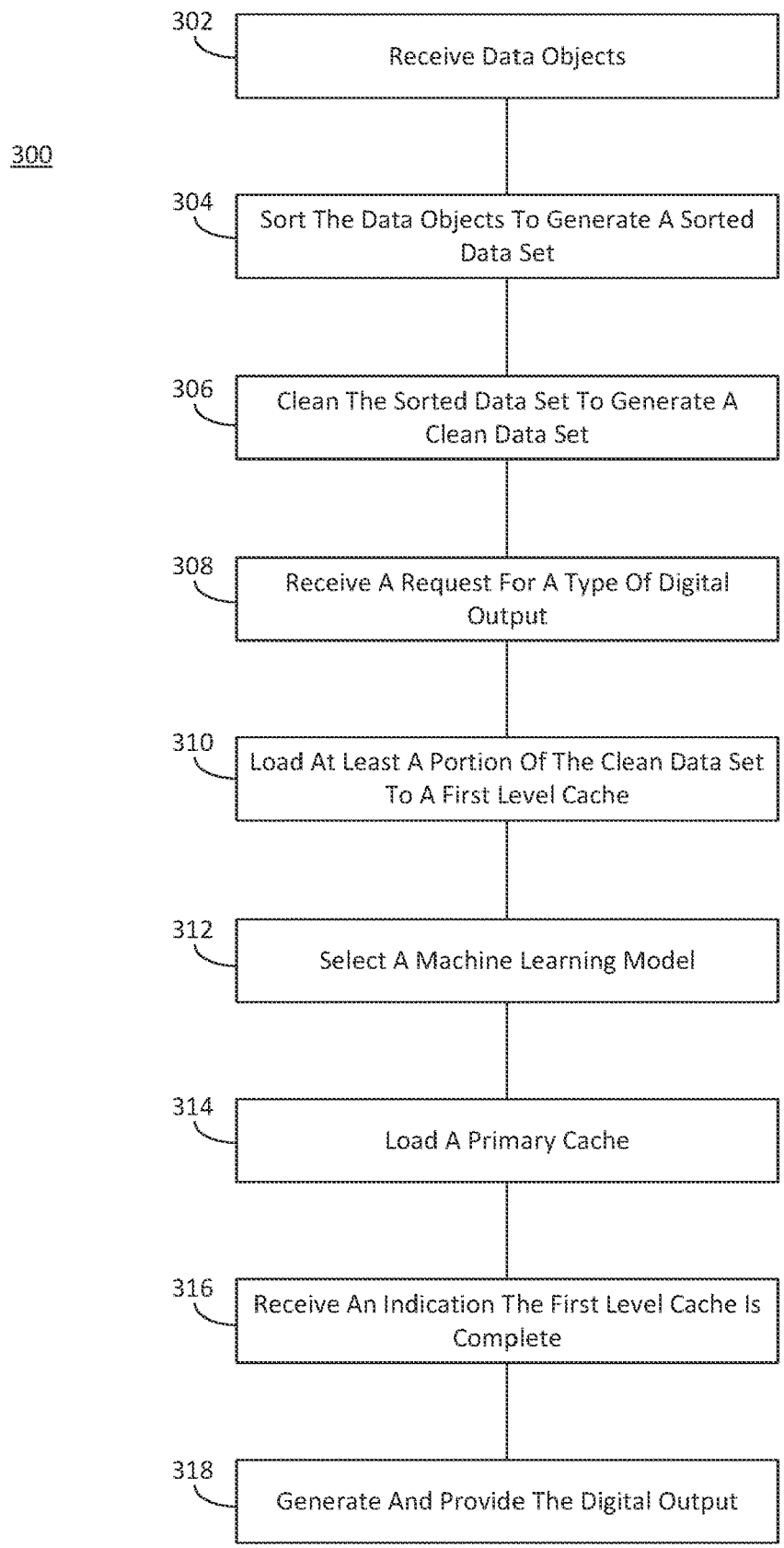
FIG. 3 is an illustration of an example method for multi-cache based digital output generation, in accordance with an implementation.

FIG. 3 is an illustration of an example method for multi-cache based digital output generation, in accordance with an implementation. The process 300 can be performed by one or more system or component depicted in FIG. 1 or FIG. 4, including, for example, a data processing system, data sorting component, pre-processor component, multi-level cache builder component, machine learning generator, or digital output generator component. At ACT 302, the data processing system can receive data objects. The data processing system can receive the data objects from a remote data source. The data objects can include multiple fields. The fields can correspond to information about digital content, such as an identifier of the digital content, a title of the digital content, a publisher or provider of the digital content, revenue information associated with the digital content, activity associated with the digital content, a duration of the digital content, or a location of a client computing device that rendered the digital content. A single data object can include information about one or more impressions or presentations of the digital content. A single data object can include information about a single presentation of the digital content.

The data processing system can receive multiple data objects from various remote data sources. For example, the data processing system can receive data objects from multiple cloud-based digital streaming services. The customer of the data processing system can provide or upload digital content for presentation via multiple cloud-based digital streaming services. Thus, the data processing system can retrieve or receive data objects corresponding to the digital content from each cloud-based digital streaming service.

At ACT 304, the data processing system can sort the data objects. The data processing system can sort the data objects received from the remote data sources. The data processing system can sort the data objects using any sorting technique. The data processing system can sort the data objects based on values of one or more fields in the data objects. For example, the data processing system can sort the data objects based on a customer identifier field and a video identifier field. The data processing system can sort the data objects based on a customer identifier field, digital asset identifier field, and digital asset title. The data processing system can sort the data objects based on a category associated with the digital asset, such as a season identifier. The video identifier or digital asset identifier can refer to a unique identifier. The unique identifier can be numeric, alphanumeric, or include other symbols or characters. The asset identifier can be universally or globally unique. The asset identifier can be unique to a customer identifier. The customer identifier can be universally or globally unique. The customer identifier can be alphanumeric, or include other symbols or characters. The values of the fields can be numeric, alphanumeric, or include other symbols or characters. The data processing system can sort the data objects using a sorting technique such as a bubble sort, a technique that is based on a bubble sort, or some other sorting technique, for example.

At ACT 306, the data processing system can clean the sorted data set to generate a clean data set. Cleaning the sorted data can refer to or include pre-processing the data. The data processing system can clean the sorted data using any data cleaning or pre-processing technique. For example, the data processing system can clean the sorted data by removing duplicate entries, generate values for missing values, or remove or modify noisy values.

At ACT 308, the data processing system can receive a request for a type of digital output. The type of digital output can correspond to a type of report. The type can refer to what information to be presented in the report. The type of the report can refer to a format of the report. The request can include or indicate a customer identifier associated with the report. The data processing system can receive the request via a GUI frontend provided by the data processing system via presentation layer for rendering on a client computing device.

At ACT 310, the data processing system can load at least a portion of the clean data set to a first level cache. The first level cache can be located on the data processing system, such as cache memory of the data processing system. The data processing system can load the first level cache with one or more portions of the clean data set that correspond to the information used to generate the digital output requested at ACT 308. For example, the request can indicate a time interval or range for the report, a customer identifier, and category identifier (e.g., a season of a show that includes multiple episodes per season). The data processing system can load the clean data set with data objects corresponding to the episodes in the season, for example.

The data processing system can load all of the clean data set into the first level cache, or portions of the clean data set that are available for loading into the first level cache at a given moment. In some instances, the data processing system can receive data objects from the one or more remote data sources in real-time, and may load the first level cache with available clean data as the data processing system is pre-processing the data objects. In some cases, the clean data set may be too large to fit in the first level cache, in which case the data processing system can load portions of the clean data set sequentially into the first level cache such that the data processing system can extract the relevant portions for loading into the primary cache.

At ACT 312, the data processing system can select a model. The data processing system can select a model trained using a machine learning technique. The data processing system can select the model based on the type of digital output requested. The data processing system can select a model configured to output what data to extract from the first level cache for loading into the primary cache. The data processing system can select the model based on various parameters, including, for example, the type of digital output, customer identifier, or range of values. The data processing system can use the selected model to load the primary cache.

At ACT 314, the data processing system can load a primary cache with portions of the data extracted from the first level cache. The data processing system can use a model trained using a machine learning technique to determine what data to extract from the first level cache for loading into the primary cache. For example, the data processing system can determine which fields contain information to be used to generate the digital output, and extract the corresponding values from the clean data set stored in the first level cache for loading into the primary cache.

The data processing system can receive an indication that the first level cache is complete at ACT 316. The data processing system can receive the indication based on an output from a machine learning model, for example. The machine learning model can indicate that the first level cache is complete. The machine learning model can be trained using historical data and types of digital outputs. The data processing system can use the machine learning model to predict whether the first level cache is complete. For example, the data processing system can use the model to predict whether the number of entries or records in the clean data set loaded into the first level cache correspond to an expected number of entries or records based on the type of digital output requested or the customer identifier. The number of entries can correspond to the number of data objects or the number of fields. The output of the machine learning model can indicate the number of entries to expect (or a size of the data in gigabytes, for example). The data processing system can compare the number of entries in the first level cache with the number of entries to expect output from the machine learning model to determine whether the first level cache is complete. If the number of entries in the first level cache match the number of expected entries output by the machine learning model, then the data processing system can determine the first level cache is complete. The match can include an exact match or a substantial or approximate match (e.g., plus or minus 1%, 2%, 3%, 4%, 5%, 6% or other percentage of the expected number of entries).

At ACT 318, the data processing system can proceed to process the data in the primary cache to generate the requested digital output or report. The data processing system can transmit the digital output to the client computing device that requested the report for presentation via a display device of the computing device.

Figure 4:
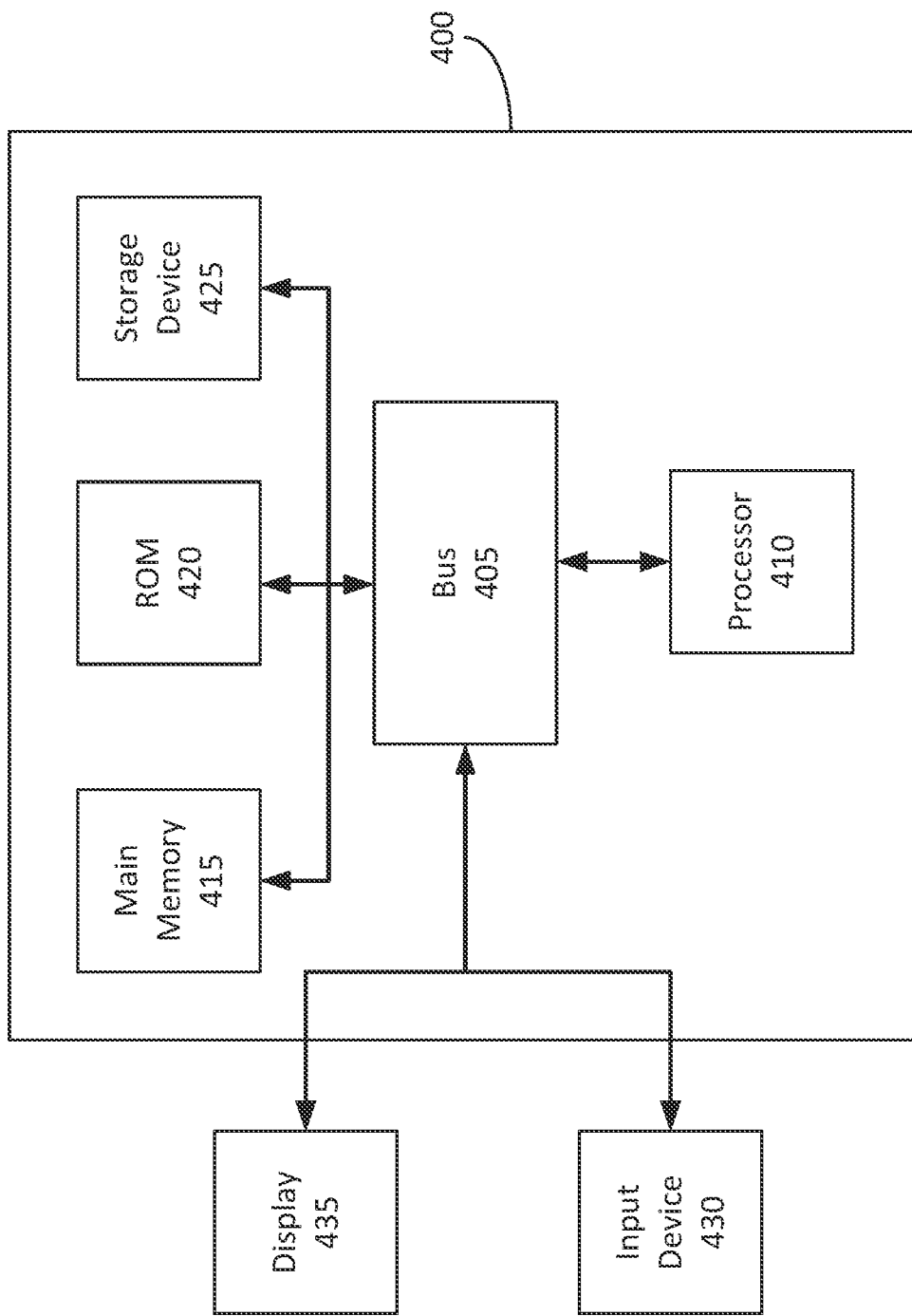
FIG. 4 is a block diagram illustrating a general architecture for a computer system that can be employed to implement elements of the systems and methods described and illustrated herein, including, for example, the system depicted in FIG. 1, the operational flows depicted in FIGS. 2 and 7, and the method depicted in FIG. 3.

FIG. 4 is a block diagram of an example computer system 400. The computer system or computing device 400 can include or be used to implement the system 100, or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 116. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 116.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 128 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

FIG. 7 depicts an example method of receiving raw input data and training a model with a machine learning technique, in accordance with an implementation. The method 700 can be performed by one or more system or component depicted herein, including, for example, the data processing system. At 702, the data processing system 102 can receive raw data, which can refer to data in its source form, without any prior preparation for ML. The raw data can include CSV correlated data. The data processing system can receive the CSV correlated data, or raw data, via manual upload or an API call directly to the source providing entity, such as a digital video streaming service's analytics reporting API. The raw data can be a large dataset that the data processing system can significantly preprocess in order to start feeding this data to the primary ML cache.

At 702, the data processing system can perform data engineering. The data processing system, in a first phase, can load the raw data to the pre-processor cache. This preprocessing can apply several algorithms to "clean" or "data engineer" the data for loading to the primary cache. This cleaning/engineering can include several steps that then tunes the prepared data to create the features expected by the machine learning model.

At 706, the data processing system can output prepared data. The prepared data can be the output of the data engineering at 704. The prepared data can be cleaned and sorted. The prepared data at 706 can refer to a dataset that is in a form ready for a machine learning task. The prepared data can be parsed, joined, and put into a tabular form by the data processing system. The prepared data can be aggregated and summarized to the correct or desired granularity by the data processing system. In the case of supervised learning tasks; as can be done with the primary and secondary caches, the target feature can be present. The data processing system can drop irrelevant columns, and invalid records can be filtered out.

At 708, the data processing system can perform featured engineering. This can refer to the dataset with the tuned features expected by the model—that is, performing certain machine learning-specific operations on the columns in the prepared dataset, and creating new features that the Claim processor preprocessing model during training and prediction.

The data processing system can perform each of these operations to facilitate the machine learning model generator to build a better predictive model. For example, the data processing system can perform data cleansing by removing or correcting records with corrupted or invalid values from raw data, as well as removing records that are missing a large number of columns. The data processing system can perform instances selection and partitioning by selecting data points from the input dataset to create training, evaluation (validation), and test sets. This process can includes techniques for repeatable random sampling, minority classes oversampling, and stratified partitioning.

The data processing system can perform feature tuning to improve the quality of a feature for ML, which can includes scaling and normalizing numeric values, inputting missing values, clipping outliers, and adjusting values with skewed distributions. The data processing system can perform representation transformation by converting a numeric feature to a categorical feature (e.g., through bucketization), and converting categorical features to a numeric representation. The data processing system can perform Feature extraction by reducing the number of features by creating lower-dimension, more powerful data representations using techniques such as PCA, embedding extraction, and hashing. The data processing system can perform feature selection by selecting a subset of the input features for training the model, and ignoring the irrelevant or redundant ones, using filter or wrapper methods. This can also involve simply dropping features if the features are missing a large number of values.

At 710, the data processing system can provide the engineering features. The data processing system can perform feature construction by creating new features by using techniques, such as polynomial expansion (by using univariate mathematical functions) or feature crossing (to capture feature interactions). The data processing system can implement "Features" by constructing using logic from the domain of the ML use case.

The engineered features can be output to the machine learning component at 712 to train a model using a machine learning technique. For example, the data processing system can train the model 120 or the machine learning model primary cache 124.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the data sorting component 106, pre-processor component 108, multi-level cache builder component 110 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 101). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the local computing device 128 or the remote data source 130).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the data sorting component 106 and pre-processor component 108 can be a single component, app, or program, or a logic device having one or more processing circuits, or part of one or more servers of the data processing system 102.

Having now described some illustrative implementations, it is apparent that the foregoing is illustrative and not limiting, having been provided by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for multi-cache-based digital output generation, comprising:
   a data processing system comprising memory and one or more processors to:
   receive, via a network and from a data source remote from the data processing system, a plurality of data objects, wherein each of the plurality of data objects comprise a plurality of fields;
   sort the plurality of data objects based on a field of the plurality of fields to generate a sorted data set;
   clean the sorted data set to generate a clean data set based on at least one of a missing data cleansing policy, a noisy data cleansing policy, or an inconsistent data cleansing policy;
   receive, from a client device via the network, a request for a type of digital output based the plurality of data objects received from the data source;
   load, responsive to the request, at least a portion of the clean data set to a first level cache of the data processing system;
   select, responsive to the request, a machine learning model configured for the type of digital output;
   load, responsive to the request, a primary cache with a subset of fields stored in the first level cache selected based on the machine learning model configured for the type of digital output;
   receive an indication that the first level cache is complete;
   generate, based on the indication that the first level cache is complete, a digital output corresponding to the type of digital output from data in the primary cache; and
   provide, responsive to the request from the client device, the digital output to the client device for display via a display device of the client device.

2. The system of claim 1, wherein the data source comprises a cloud-based video streaming service.

3. The system of claim 1, wherein the plurality of fields comprise a customer identifier field and a video identifier field.

4. The system of claim 1, comprising the data processing system to:
   apply the missing data cleansing policy to the sorted data set to identify one or more entries in the sorted data set that lack values for a second field of the plurality of fields; and
   determine, based on a historical model of values for the second field, one or more values for the second field of each of the one or more entries; and
   generate the clean data set with the one or more values for the second field determined based on the historical model of values for the second field.

5. The system of claim 1, comprising the data processing system to:
   apply the noisy data cleansing policy to the sorted data set to identify:
      a first entry in the sorted data set that contains a first value for the field of the plurality of fields, and a second value for a second field of the plurality of fields; and
      a second entry in the sorted data set that contains the first value for the field of the plurality of fields, and a third value for the second field of the plurality of fields, the third value different from the second value; and
   remove, responsive to identification of a mismatch between the second field of the first entry and the second field of the second entry and a match between the field of the first entry and the first field of the second entry, the first entry and the second entry from the sorted data set to generate the clean data set without the first entry and the second entry.

6. The system of claim 1, comprising the data processing system to:
 apply the inconsistent data cleansing policy to the sorted data set to identify a first entry that matches a second entry; and
 remove one of the first entry or the second entry from the sorted data set to generate the clean data set without the one of the first entry or the second entry.

7. The system of claim 1, comprising the data processing system to:
 store, based on a function that generates an offset value to reference a pointer value in a database, the clean data set in the database accessible to the data processing system.

8. The system of claim 1, comprising the data processing system to:
 provide an interactive graphical user interface for display via the client device;
 receive one or more instructions via the client device to establish the type of digital output; and
 generate the machine learning model configured for the type of digital output.

9. The system of claim 1, wherein the machine learning model is based on a k-nearest neighbors function or a k-means clustering function, comprising:
 the data processing system to identify an output of the machine learning model that indicates the subset of fields to be loaded to the primary cache.

10. The system of claim 1, comprising the data processing system to:
 receive a second request from a second client device subsequent to the request from the client device;
 clear, responsive to the second request, the primary cache; and
 reload the primary cache responsive to the second request.

11. A method of multi-cache-based digital output generation, comprising:
 receiving, by a data processing system comprising one or more processors and memory, via a network and from a data source remote from the data processing system, a plurality of data objects, wherein each of the plurality of data objects comprise a plurality of fields;
 sorting, by the data processing system, the plurality of data objects based on a field of the plurality of fields to generate a sorted data set;
 cleaning, by the data processing system, the sorted data set to generate a clean data set based on at least one of a missing data cleansing policy, a noisy data cleansing policy, or an inconsistent data cleansing policy;
 receiving, by the data processing system from a client device via the network, a request for a type of digital output based the plurality of data objects received from the data source;
 loading, by the data processing system responsive to the request, at least a portion of the clean data set to a first level cache of the data processing system;
 selecting, by the data processing system responsive to the request, a machine learning model configured for the type of digital output;
 loading, by the data processing system responsive to the request, a primary cache with a subset of fields stored in the first level cache selected based on the machine learning model configured for the type of digital output;
 receiving, by the data processing system, an indication that the first level cache is complete;
 generating, by the data processing system based on the indication that the first level cache is complete, a digital output corresponding to the type of digital output from data in the primary cache; and
 providing, by the data processing system responsive to the request from the client device, the digital output to the client device for display via a display device of the client device.

12. The method of claim 11, wherein the data source comprises a cloud-based video streaming service.

13. The method of claim 11, wherein the plurality of fields comprise a customer identifier field and a video identifier field.

14. The method of claim 11, comprising:
 applying, by the data processing system, the missing data cleansing policy to the sorted data set to identify one or more entries in the sorted data set that lack values for a second field of the plurality of fields; and
 determining, by the data processing system, based on a historical model of values for the second field, one or more values for the second field of each of the one or more entries; and
 generating, by the data processing system, the clean data set with the one or more values for the second field determined based on the historical model of values for the second field.

15. The method of claim 11, comprising:
 applying, by the data processing system, the noisy data cleansing policy to the sorted data set to identify:
  a first entry in the sorted data set that contains a first value for the field of the plurality of fields, and a second value for a second field of the plurality of fields;
  a second entry in the sorted data set that contains the first value for the field of the plurality of fields, and a third value for the second field of the plurality of fields, the third value different from the second value; and
 removing, by the data processing system, responsive to identification of a mismatch between the second field of the first entry and the second field of the second entry and a match between the field of the first entry and the first field of the second entry, the first entry and the second entry from the sorted data set to generate the clean data set without the first entry and the second entry.

16. The method of claim 11, comprising:
 applying, by the data processing system, the inconsistent data cleansing policy to the sorted data set to identify a first entry that matches a second entry; and
 removing, by the data processing system, one of the first entry or the second entry from the sorted data set to generate the clean data set without the one of the first entry or the second entry.

17. The method of claim 11, comprising:
 storing, by the data processing system, based on a function that generates an offset value to reference a pointer value in a database, the clean data set in the database accessible to the data processing system.

18. The method of claim 11, comprising:
 providing, by the data processing system, an interactive graphical user interface for display via the client device;
 receiving, by the data processing system, one or more instructions via the client device to establish the type of digital output; and
 generating, by the data processing system, the machine learning model configured for the type of digital output.

19. The method of claim 11, wherein the machine learning model is based on a k-nearest neighbors function or a k-means clustering function, comprising:
- identifying, by the data processing system, an output of the machine learning model that indicates the subset of fields to be loaded to the primary cache.

20. The method of claim 11, comprising:
- receiving, by the data processing system, a second request from a second client device subsequent to the request from the client device;
- clearing, by the data processing system responsive to the second request, the primary cache; and
- reloading, by the data processing system, the primary cache responsive to the second request.

* * * * *